Patented July 17, 1934

1,966,927

UNITED STATES PATENT OFFICE 1,966,927

PROCESS OF CANNING VEGETABLES

Augustus H. Fiske, Warren, R. I., assignor to Rumford Chemical Works, Rumford, R. I., a corporation of Rhode Island No Drawing. Application April 15, 1931, Serial No. 530,315

2 Claims. (Cl. 99—8)

In the canning of vegetables and fruits of acid nature two difficulties have been encountered; first, the discoloration of the vegetable or fruit on removal of the skin or peel; and second, the destructive effect of the acid on the metal can which caused the material in the can to spoil. This is particularly true in the case of such vegetables as potatoes and white squash and such fruits as apples and peaches. In order to overcome the action of the acid on the metal, in some cases the tin plating has been coated with a protecting enamel which helped resist the action of the acid content in the vegetables which had dissolved out and appears in the salt solution, but this was an added expense to the canning cost, and did not take care of the tendency to discolor.

The usual canning process briefly is as follows: The vegetable or fruit is peeled and cleaned and then subjected to a blanching action by dipping it in boiling water for a longer or shorter period according to the nature of the vegetable. The vegetable is then drained and placed in the can. The can is next filled with a dilute salt solution, usually about one percent, and sealed. The final cooking of the vegetable or fruit and the sterilization is performed at the same time in a pressure sterilizer usually under different pressures maintained for varying period but usually about fifteen or twenty minutes, according to the fruit or vegetable being canned.

After the blanching process the vegetables or fruits are particularly liable to discoloration unless immediately covered by a liquid or the can instantly sealed.

By my present invention, which involves the neutralization of the acid nature of the fruit or vegetable, I avoid the injurious results from the action of the acid of the vegetable or fruit on the inside of the can and also so neutralize the acid developed in the fruit or vegetable itself that the tendency to discoloration is avoided.

The acidity of the fruit or vegetable may be neutralized in several ways, but a particular problem exists in that it is important that the water in which the blanching takes place be maintained neutral as acidity or alkalinity of the blanching water would affect the delicate flavor and color of the vegetable.

My invention contemplates the addition of an insoluble carbonate or phosphate to the blanching water in a form in which the same is suspended in the water and neutralizes any acidity present. As the material is merely suspended the blanching solution remains neutral. The suspended material, however, is reacted upon immediately by any acid from the fruit or vegetable and so the acidity of the vegetable or fruit during the process of blanching is neutralized. When the blanching water is drained off, the suspended material goes with it, and there is no residual matter left in the vegetable or fruit.

If desired, the fruit or vegetable may be washed before being placed in the cans. When using calcium carbonate to neutralize the acids of the fruits or vegetables, this is suspended in the blanching water in the form of a finely divided powder. In the case of such a salt as calcium carbonate, the chemical reaction would be as follows:

$$CaCO_3 + H_2R = CaR + H_2O + CO_2.$$

Successful results are also secured by the use of tricalcium phosphate in a finely divided condition. When this material reacts with the acid it forms a dicalcium phosphate which will still remain insoluble and neutral although the acid of the vegetable will be neutralized without affecting the neutrality of the blanching water. In this case the chemical action would be as follows:

$$Ca_3(PO_4)_2 + H_2R = 2Ca(HPO_4) + CaR.$$

In both the above illustrations the R represents the acid radical of the vegetable or fruit acidity.

In factory operation it is advisable to determine first the exact amount of acid which is developed from the known quantity of vegetable or fruit and to add the calculated amount of calcium carbonate or tricalcium phosphate from time to time as needed to take care of this acidity so that the vegetable on leaving the blanching water will be approximately neutral.

Although by means of my method the vegetable or fruit is neutralized, there is no decomposition of the fruit and the absence of acid therein prevents the likelihood of decomposition of the material after the same is in the can.

Various modifications in the canning process as well as in various neutralizing agents used may be resorted to without departing from the spirit of my invention if within the limits of the appended claims.

What I therefore claim and desire to secure by Letters Patent is:

1. That method of preserving fruits or vegetables containing acid juices without destroying the color thereof, consisting in treating the same in a bath of hot water having suspended therein a finely divided neutral salt insoluble in water and of the class consisting of edible phosphates and carbonates, while maintaining the neutrality of such a bath, until the acid of the juice is reactively neutralized by decomposition of so much of the suspended salt as is needed in the neutralization without decomposing the remainder or disturbing the neutral character of the bath and the product as a whole, in drawing off the bath and suspended salt, in canning the product in a weak saline solution and in heating the cans to sterilize the product.

2. That method of preserving fruits or vegetables containing acid juices without destroying the color thereof, consisting in treating the same in a bath of hot water having suspended therein a finely divided neutral salt insoluble in water and of the class consisting of edible phosphates and carbonates of calcium, while maintaining the neutrality of such a bath, until the acid of the juice is reactively neutralized by decomposition of so much of the suspended salt as is needed in the neutralization without decomposing the remainder or disturbing the neutral character of the bath and the product as a whole, in drawing off the bath and suspended salt, in canning the product in a weak saline solution and in heating the cans to sterilize the product.

AUGUSTUS H. FISKE.